(12) United States Patent
Matsushima

(10) Patent No.: US 7,110,071 B2
(45) Date of Patent: Sep. 19, 2006

(54) LIQUID CRYSTAL DISPLAY DEVICE AND ELECTRONIC APPARATUS

(75) Inventor: Toshiharu Matsushima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 43 days.

(21) Appl. No.: 10/828,303

(22) Filed: Apr. 21, 2004

(65) Prior Publication Data
US 2004/0246417 A1 Dec. 9, 2004

(30) Foreign Application Priority Data
May 29, 2003 (JP) .............................. 2003-153212
Feb. 6, 2004 (JP) .............................. 2004-031057

(51) Int. Cl.
*G02F 1/1335* (2006.01)
*G02F 1/13* (2006.01)
(52) U.S. Cl. .................... 349/114; 349/98; 349/113; 349/117; 349/105; 349/194
(58) Field of Classification Search ................ 349/98, 349/113, 114, 117, 194, 105
See application file for complete search history.

(56) References Cited

U.S. PATENT DOCUMENTS

| 2003/0067572 A1* | 4/2003 | Umeda et al. | ............... 349/117 |
| 2003/0076463 A1 | 4/2003 | Ozawa et al. | |
| 2003/0164921 A1* | 9/2003 | Uesaka et al. | ............... 349/194 |
| 2004/0119914 A1* | 6/2004 | Tsuchiya | ............... 349/98 |

FOREIGN PATENT DOCUMENTS

| CN | 1343314 A | 3/2000 |
| CN | 1410811 A | 9/2002 |
| EP | 1 164 391 A1 | 12/2001 |
| JP | A-09-160022 | 6/1997 |
| JP | A-2000-029010 | 1/2000 |
| JP | 2000-321576 A | 11/2000 |
| JP | A 2002-31717 | 1/2002 |
| JP | A-2002-311426 | 10/2002 |
| JP | A-2003-149644 | 5/2003 |

* cited by examiner

Primary Examiner—Huyen Ngo
Assistant Examiner—Julie-Huyen L. Ngo
(74) Attorney, Agent, or Firm—Oliff & Berridge, PLC (57) ABSTRACT

The invention provides a transflective liquid crystal display device in which display is bright, with high contrast, and with less dependence on the viewing angle in the transmissive display mode. A liquid crystal display device includes a liquid crystal cell, the liquid crystal cell including an upper substrate, a lower substrate, a liquid crystal layer between the upper and lower substrates, and a transflective layer on the inner surface of the lower substrate. The liquid crystal display device further includes a first elliptical polarizer elliptical polarized light from the upper substrate being incident on the liquid crystal layer; and a second elliptical polarizer, elliptical polarized light from the lower substrate being incident on the liquid crystal layer. Only the first elliptical polarizer has a liquid crystal film in which a hybrid alignment is fixed.

10 Claims, 7 Drawing Sheets

LIQUID CRYSTAL DISPLAY DEVICE AND ELECTRONIC APPARATUS

BACKGROUND OF THE INVENTION

1. Field of Invention

The present invention relates to a transflective liquid crystal display device enabling both a reflective mode and a transmissive mode, and an electronic apparatus including the same.

2. Description of Related Art

A transflective liquid crystal display device combining a reflective display mode with a transmissive display mode consumes lower amounts of power and performs clear display regardless of ambient brightness by switching to either a reflective display mode or a transmissive display mode according to ambient brightness.

A related art transflective liquid crystal display device has a structure in which a liquid crystal layer is disposed between an upper substrate and a lower substrate each having a circular polarizer. It has a reflective film formed of metal, such as aluminum, on the inner side of the lower substrate, the film having a slit to transmit light. This reflective film functions as a transflective film. In such a liquid crystal display device, in the reflective display mode, ambient light incident from the side of the upper substrate passes through the liquid crystal layer, is reflected by the reflective film disposed on the inner side of the lower substrate, passes through the liquid crystal layer again, and then is output from the side of the upper substrate. In the transmissive display mode, light from the backlight is incident from the side of the lower substrate, passes through the liquid crystal layer from the slit formed in the reflective film, and then is output from the side of the upper substrate. Therefore, the area in which the slit of the reflective film is formed is a transmissive display area. The area in which the slit of the reflective film is not formed is a reflective display area.

With respect to such a transflective liquid crystal display device, Japanese Unexamined Patent Application Publication No. 2002-31717 discloses a technique to enhance the brightness of display and to achieve display with high contrast and less dependence on the viewing angle in the transmissive display mode. In the technique, with respect to a circular polarizer disposed on the outer side of each substrate, an optical anisotropic element formed of a liquid crystal film in which a nematic hybrid alignment structure is fixed is used as a retardation plate.

SUMMARY OF THE INVENTION

In the technique of Japanese Unexamined Patent Application Publication No. 2002-31717, an enhancement in the brightness, contrast, and viewing angle characteristics in the transmissive display mode is attained. However, in the reflective display mode, such an enhancement is not attained because the optical anisotropic element is disposed at the rear of the transflective layer as viewed from the observer. If the liquid crystal display device is applied to an electronic apparatus used often in the reflective display mode, the provided optical anisotropic element does not fulfill its function. In addition, providing a useless element causes an increase in cost or size of the device.

The present invention addresses the above problems, by providing a transflective liquid crystal display device in which the brightness, contrast, and viewing angle characteristics are enhanced not only in the transmissive display mode, but also in the reflective display mode, and increase in cost and size of the device are minimized; and an electronic apparatus including the same.

In order to address the above problems, the liquid crystal display device of an aspect of the present invention is a liquid crystal display device including a liquid crystal cell, the liquid crystal cell including an upper substrate, a lower substrate, a liquid crystal layer between the upper and lower substrates facing each other, and a transflective layer on the inner surface of the lower substrate. The liquid crystal display device further includes a first elliptical polarizer, elliptical polarized light from the upper substrate being incident on the liquid crystal layer; and a second elliptical polarizer, elliptical polarized light from the lower substrate being incident on the liquid crystal layer. Only the first elliptical polarizer has a liquid crystal film in which a hybrid alignment is fixed.

In such a liquid crystal display device, a film in which a hybrid alignment is fixed is used for only the elliptical polarizer (the layer that can produce circularly polarized light or elliptically polarized light) on the upper side of the liquid crystal cell. Therefore, an enhancement in the brightness, contrast, and viewing angle characteristics is attained in both the transmissive display mode using light incident from the side of the lower substrate (light from the light source) and the reflective display mode using light incident from the side of the upper substrate (natural light). Therefore, as compared with a related art liquid crystal display device, if the liquid crystal display device of an aspect of the present invention is applied to an electronic apparatus used often in the reflective display mode, the above enhancement is attained. Since the liquid crystal film is used for only the elliptical polarizer on the upper side of the liquid crystal cell, increase in cost or size of the device is minimized.

In an aspect of the present invention, the first elliptical polarizer may include a polarizer transmitting linearly polarized light, the liquid crystal film, and a stretched film. In this case, the first elliptical polarizer is a wide-band elliptical polarizer and a high-contrast liquid crystal display device is achieved. No particular limitation is imposed on the type of the stretched film. Related art stretched films, such as a uniaxial stretched film and a biaxial stretched film may be used.

As the liquid crystal film, for example, a film in which a nematic hybrid alignment is fixed may be used. The in-plane retardation of the liquid crystal film in which a nematic hybrid alignment is fixed may range from 70 to 140 nm. Generally, with respect to monochromatic light of $\lambda=589$ nm, a wide-band elliptical polarizer is composed of a substantial $\lambda/4$ stretched film and a substantial $\lambda/2$ stretched film. If the in-plane retardation of the liquid crystal film in which a nematic hybrid alignment is fixed is in this range, a wide-band elliptical polarizer can be composed of a substantial $\lambda/2$ stretched film and the liquid crystal film in which a nematic hybrid alignment is fixed.

The axis having the higher refractive index in the plane of the liquid crystal film may be substantially parallel to the central axis of the liquid crystal layer (for example, the angle with respect to the central axis is about 10° as an absolute value). If it is in this range, anisotropy of refractive index of liquid crystal molecules of the liquid crystal cell is favorably compensated by the liquid crystal film in which a nematic hybrid alignment is fixed, and a liquid crystal display device having superior viewing angle characteristics is achieved. When the liquid crystal display device is observed from an angle, the area in which gray scale inversion occurs in transmissive display mode is very small. As the liquid crystal film, a film in which, for example, a discotic hybrid alignment is fixed may be used.

In an aspect of the present invention, the twist angle of the liquid crystal layer may range from 0° to 70°. The retardation value of the liquid crystal layer in the transmissive display area may range from 240 to 350 nm. The retardation value of the liquid crystal layer in the reflective display area may range from 140 to 260 nm.

In a related art transflective liquid crystal display device, the optical path length is different between the reflective display area and the transmissive display area. Therefore, if the degree of polarization by the liquid crystal layer is adjusted to the reflective display area, the degree of polarization is inadequate in the transmissive display area and the luminance or contrast of the transmissive display area decreases. The inventor of the present invention found that it is preferable to control the twist angle of the liquid crystal layer and the product $\Delta n \cdot d$ (retardation value) of birefringence difference $\Delta n$ of the liquid crystal and thickness d of the liquid crystal layer within the above range in order to obtain a structure of liquid crystal layer that can maximize the luminance of the transmissive display area without lowering the quality of display in the reflective display area. In the liquid crystal display device of an aspect of the present invention, by determining the twist angle and $\Delta n \cdot d$ (retardation value) of transmissive display area and the reflective display area within the above range, it is possible to achieve both superior luminance in the transmissive display area and superior quality of display in the reflective display area at a usable drive voltage.

In an aspect of the present invention, the liquid crystal cell may have an adjusting layer to make the thickness of the liquid crystal layer in the reflective display area smaller than that in the transmissive display area. In the transflective liquid crystal display device, transmissive display light passes through the liquid crystal layer only once and then it is output. Reflective display light passes through the liquid crystal layer twice. Therefore, it is difficult to optimize the retardation $\Delta n \cdot d$ in both the transmissive display light and the reflective display light. By providing an adjusting layer to make the thickness of the liquid crystal layer different between the reflective display area and the transmissive display area, it is possible to optimize the retardation $\Delta n \cdot d$ in both the transmissive display light and the reflective display light, and to achieve bright reflective display and transmissive display.

Next, the liquid crystal display device of an aspect of the present invention can be used as a display unit of an electronic apparatus, such as a mobile phone and a mobile computer. Such an electronic apparatus has a reflective display mode and a transmissive display mode. It can perform display with superior viewing-angle characteristics in each mode. Also in the reflective display mode, display that is bright, with high contrast, and with less dependence on the viewing angle is achieved.

DETAILED DESCRIPTION OF EXEMPLARY EMBODIMENTS

The exemplary embodiments of the present invention will now be described with reference to the drawings. The retardation value $\Delta n \cdot d$ is a value at 589 nm unless otherwise noted. The axis angle is positive counterclockwise from the reference axis (see FIG. 2) as viewed from the upper side of the liquid crystal cell.

First Exemplary Embodiment

Figure 1:
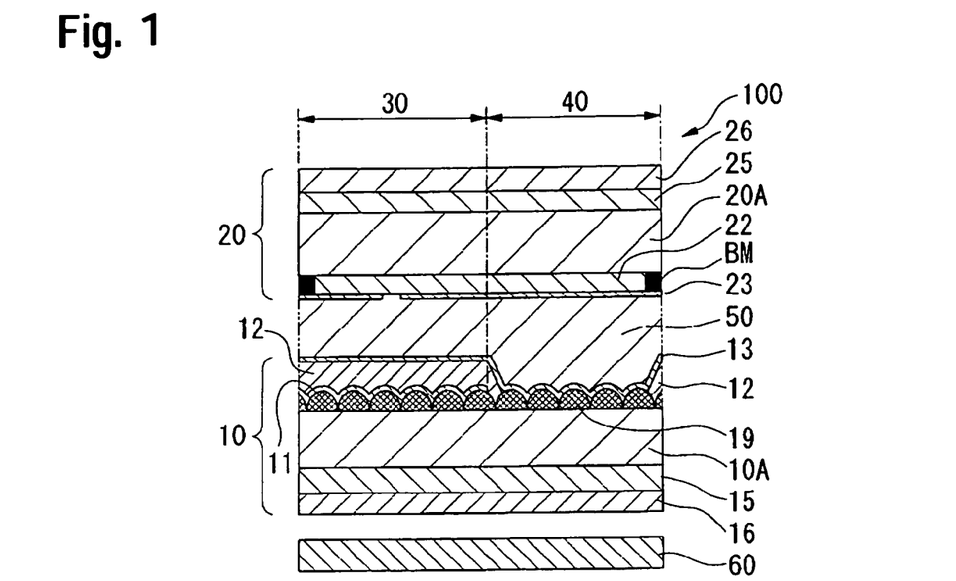
FIG. 1 is a schematic showing the liquid crystal display device of the first exemplary embodiment.

FIG. 1 a partial sectioned schematic showing a pixel of a liquid crystal display device having the structure according to an aspect of the present invention. The liquid crystal display device 100 shown in this figure is an active-matrix transflective liquid crystal display device including a liquid crystal layer 50 disposed between an array substrate 10 and an opposite substrate 20 facing each other. A backlight 60 is provided on the outer side of the array substrate 10. A reflective display area 30 and a transmissive display area 40 are provided in one pixel. The liquid crystal display device 100 of this exemplary embodiment has a display surface on the upper side in the drawing (on the outer side of the opposite substrate 20). An observer who views the display is disposed on the upper side in the drawing.

With respect to the array substrate 10 shown in FIG. 1, on the liquid crystal layer 50 side of the lower substrate 10A, a rough resin layer 19 for scattering is formed. Partly on the resin layer 19, a reflective layer 11 and a transparent insulating film 12 covering the reflective layer 11 are formed. A pixel electrode 13 and an alignment layer (not shown) covering the pixel electrode 13 are laminatedly formed on the insulating film 12 and the substrate 10. The reflective layer 11 is formed in a pattern in part of the display area of the pixel. The area in which the reflective layer 11 is formed is the reflective display area 30, the rest of display area of the pixel is the transmissive display area 40. The insulating film 12 functions as an adjusting layer making the thickness of the liquid crystal layer different between the reflective display area 30 and the transmissive display area 40. On the outer side of the lower substrate 10A, a retardation plate 15 and a linear polarizer 16 are disposed as an elliptical polarizer.

With respect to the opposite substrate 20, on the liquid crystal layer 50 side of the upper substrate 20A, a color filter 22 is formed. On the color filter 22, an opposite electrode 23 is formed. On the liquid crystal layer 50 side of the opposite electrode 23, an alignment layer (not shown) is laminated. On the outer side of the upper substrate 20A, a retardation plate 25 and a linear polarizer 26 are disposed as an elliptical polarizer.

The liquid crystal layer 50 disposed between the array substrate 10 and the opposite substrate 20 is sealed between the substrates with a seal provided on the edge of both substrates 10 and 20. The liquid crystal layer 50 is, as shown in FIG. 1, shared by the reflective display area 30 and the transmissive display area 40. Therefore, the birefringence difference $\Delta n$ of liquid crystal forming the liquid crystal layer 50 is the same between the reflective display area 30 and the transmissive display area 40. Specifically, in the liquid crystal display device 100 of this exemplary embodiment, the thickness of the liquid crystal layer in the reflective display area 30 is dr and the thickness of the liquid crystal layer in the transmissive display area 40 is dt. Therefore, the product $\Delta n \cdot d$ of birefringence difference $\Delta n$ of the liquid crystal and thickness d of the liquid crystal layer is $\Delta n \cdot dr$ in the reflective display area 30, and $\Delta n \cdot dt$ in the transmissive display area 40. Specifically, $\Delta n \cdot dr$ in the reflective display area 30 is determined from 140 to 260 nm (for example, 190 nm), and $\Delta n \cdot dt$ in the transmissive display area 40 is determined from 240 to 350 nm (for example, 325 nm).

Figure 2:
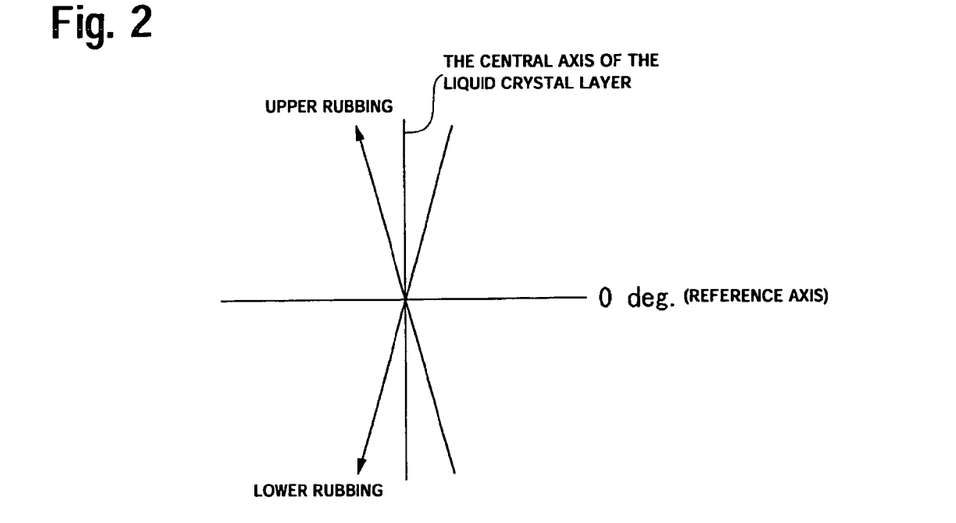
FIG. 2 is a schematic of the direction of rubbing provided to the liquid crystal and the central axis of the liquid crystal layer.

Next, FIG. 2 illustrates the relation between the direction of rubbing provided to the liquid crystal and the central axis of the liquid crystal layer in the liquid crystal display device 100 of this exemplary embodiment. The reference axis is in the horizontal direction as viewed from the side of the upper substrate 20A, and the counterclockwise direction is positive. In this case, the upper rubbing is 110°, the lower rubbing is −110°, and the liquid crystal molecules are twisted clockwise from 0° to 70° (for example, 40°) in the liquid crystal layer 50.

As described above, the twist angle of liquid crystal molecules is from 0° to 70°. The retardation value of the liquid crystal layer 50 in the transmissive display area 40 is from 240 to 350 nm. The retardation value of the liquid crystal layer 50 in the reflective display area 30 is from 140 to 260 nm. With respect to the liquid crystal display device of this exemplary embodiment in which the optical path length is different between the reflective display area 30 and the transmissive display area 40, the twist angle of the liquid crystal layer 50 and the product $\Delta n \cdot d$ (retardation value) of birefringence difference $\Delta n$ of the liquid crystal and thickness d of the liquid crystal layer are determined within the above ranges. Therefore, the luminance of the transmissive display area 40 can be maximized without lowering the quality of display in the reflective display area 30.

As a technique to determine the twist angle of the liquid crystal molecules and the retardation values in the reflective display area 30 and the transmissive display area 40 within the above ranges, for example, the following technique is applied. The twist angle of the liquid crystal layer 50 is determined at the same twist angle between the reflective display area 30 and the transmissive display area 40 for ease of production. Since the liquid crystal layer 50 is shared by the reflective display area 30 and the transmissive display area 40, its birefringence difference $\Delta n$ is the same between the areas. Therefore, the degree of polarization by the liquid crystal layer 50 in each display area 30, 40 is determined according to the thickness dr, dt of the liquid crystal layer in each area. If the structure of this exemplary embodiment is adopted, a bright and high-contrast display is achieved in both the reflective display mode and the transmissive display mode by only adjusting the gap between the substrates 10 and 20 and the thickness of the insulating film 12 functioning as an adjusting layer.

Figure 3:
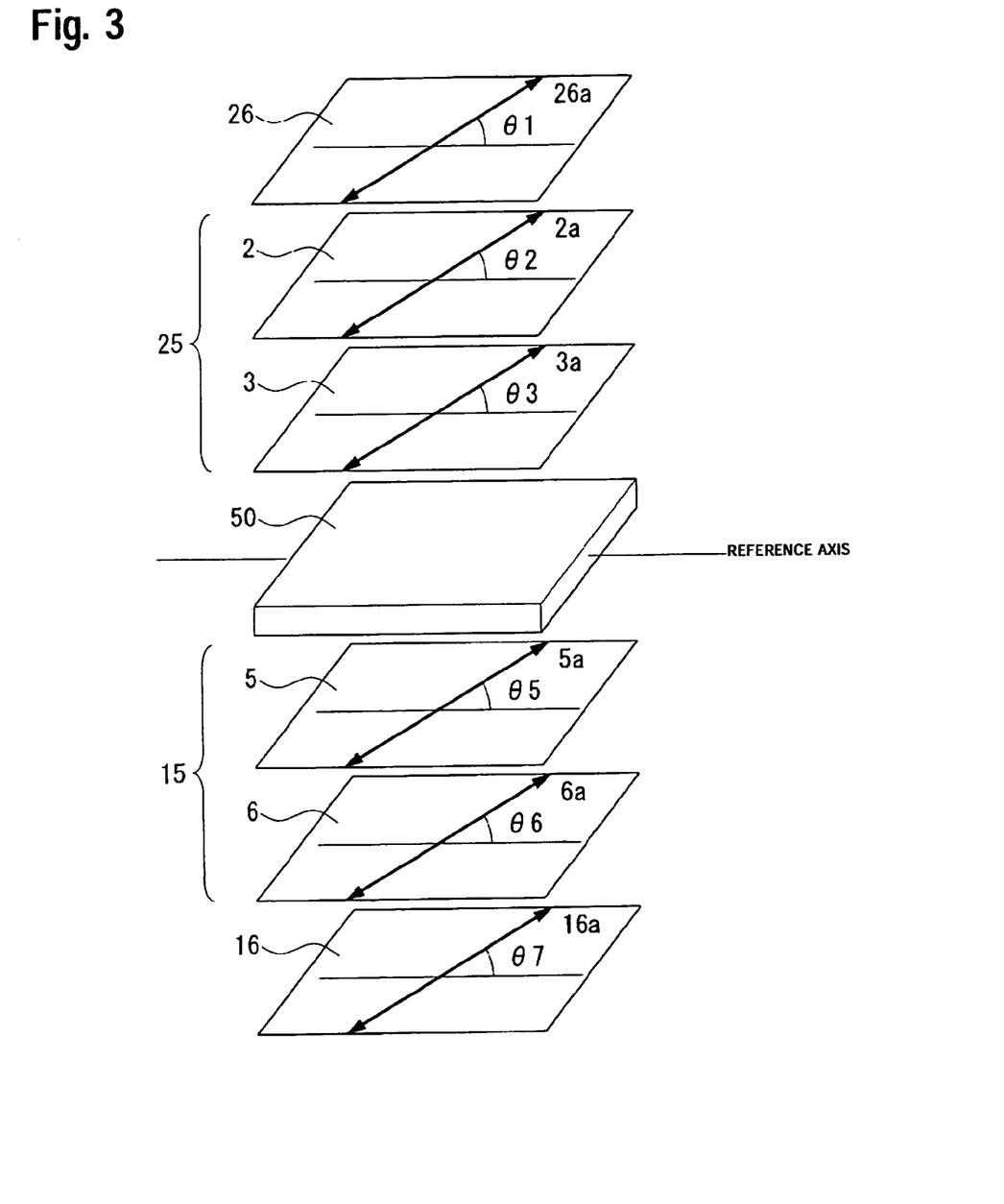
FIG. 3 is a schematic showing the laminated structure of the liquid crystal display device of FIG. 1.

FIG. 3 shows schematically part of the laminated structure of the liquid crystal display device of this exemplary embodiment. As shown in FIG. 3, in the liquid crystal display device 100 of this exemplary embodiment, the retardation plate 25 formed on the observer's side (the outer side of the upper substrate 20A) has the structure in which a liquid crystal film 3 and a retardation film 2 are laminated in this order from the liquid crystal layer 50 side. In the liquid crystal film 3, a nematic hybrid alignment is fixed. The retardation film 2 is stretched uniaxially. The retardation plate 15, formed on the backlight 60 side (the back side of the lower substrate 10A), includes a first retardation film 5 and a second retardation film 6.

The liquid crystal film 3 disposed on the outer side of the upper substrate 20A is a film in which a nematic hybrid alignment is fixed. The display performance depends on the tilting direction of the film and which side of the film is the top. It is desirable to determine the arrangement in consideration of necessary display performance. In this exemplary embodiment, the film is arranged so that the axis (slow axis 3a) having the higher refractive index in the plane of the liquid crystal film 3 is substantially parallel to (for example, at an angle of about ±10° with respect to) the central axis (see FIG. 2) of the liquid crystal layer 50. The retardation of the liquid crystal film 3 is, for example, from 70 to 140 nm. The retardation in this range achieves a wide-band elliptical polarizer.

The liquid crystal film 3 is obtained by aligning a liquid crystalline material exhibiting nematic liquid crystallinity in a nematic hybrid alignment and fixing the alignment structure by photo- or thermal-crosslinking or cooling according to the various physical properties of the liquid crystalline material. No particular limitation is imposed on the type of the liquid crystalline material as long as it exhibits nematic liquid crystallinity. Therefore, various low molecular weight liquid crystalline substances, polymeric liquid crystalline substances, and mixtures thereof can be used as the material. It does not matter whether the molecular shape of the liquid crystalline material is like a bar or a disc. For example, discotic nematic liquid crystalline materials exhibiting discotic nematic liquid crystallinity may be used. In the case of using a mixture of these materials as the liquid crystalline material, no particular limitation is imposed on the composition and ratio of the materials as long as the desired nematic hybrid alignment structure can be formed with these materials and can be fixed. For example, a mixture composed of one or a plurality of types of low molecular weight- and/or polymeric-liquid crystalline substances, one or a plurality of types of low molecular weight- and/or polymeric-non-liquid crystalline substances, and various additives may be used as the liquid crystalline material.

The bright/dark display of dots in the liquid crystal display device 100 having the above structure is the same between the reflective display area 30 and the transmissive display area 40. When the liquid crystal of the liquid crystal layer 50 is aligned in parallel to the substrates 10 and 20, the liquid crystal layer 50 acts on light passing through the liquid crystal layer 50, and dots are dark. When the liquid crystal is aligned perpendicular to the substrates 10 and 20, dots are bright. Reversely, dots may be bright when the liquid crystal of the liquid crystal layer 50 is aligned in parallel to the substrates 10 and 20. Dots may be dark when the liquid crystal is aligned perpendicular to the substrates 10 and 20. In the liquid crystal display device 100, a liquid crystal film 3 in which a hybrid alignment is fixed is used for only the retardation plate 25 on the display surface. Therefore, the brightness, contrast, and viewing angle characteristics are enhanced in both the transmissive display mode and the reflective display mode.

EXAMPLES

In order to confirm the advantageous effect of the first exemplary embodiment, with respect to the following example and comparative examples, the display characteristics were evaluated.

Example

A liquid crystal display device 100 of the first exemplary embodiment was prepared. The retardation value ($\Delta n \cdot dt$) of the transmissive display area was 325 nm. The retardation value ($\Delta n \cdot dr$) of the reflective display area was 190 nm. The liquid crystal layer 50 had a parallel alignment, and the twist angle of the liquid crystal layer 50 was 40°. As shown in FIG. 3, the angle $\theta 1$ defined by the reference axis and the absorption axis 26a of the polarizer 26 was 96°; the angle $\theta 2$ defined by the reference axis and the slow axis 2a of the retardation film 2 was 26°; and the angle $\theta 3$ defined by the reference axis and the tilting direction (the molecular arrangement direction) 3a of the liquid crystal film 3 (the liquid crystal film 3 disposed on the side of one of the substrates sandwiching the liquid crystal layer 50) was 90°. $\Delta n \cdot d$ of the retardation film 2 was 270 nm, and $\Delta n \cdot d$ of the liquid crystal film 3 was 96 nm. Here, $\Delta n \cdot d$ of the liquid crystal film is in-plane $\Delta n \cdot d$ as viewed from the direction of normal line of the liquid crystal film.

As shown in FIG. 3, the angle $\theta 7$ defined by the reference axis and the absorption axis 16a of the polarizer 16 was 164°; the angle $\theta 5$ defined by the reference axis and the slow axis 5a of the first retardation film 5 was 90°; and the angle $\theta 6$ defined by the reference axis and the slow axis 6a of the second retardation film 6 was 149°. $\Delta n \cdot d$ of the first retardation film 5 was 116 nm, and $\Delta n \cdot d$ of the second retardation film 6 was 258 nm. With respect to the liquid crystal display device of this example having the above structure, the display characteristics in the reflective display mode and the transmissive display mode were evaluated.

Comparative Example 1

A liquid crystal display device of the comparative example 1 was prepared. The liquid crystal display device had a retardation plate 25 composed of two uniaxial stretched retardation films 2 and 2'. The liquid crystal film 3 of the foregoing liquid crystal display device 100 was substituted with a uniaxial stretched retardation film.

With respect to this liquid crystal display device, the retardation value ($\Delta n \cdot dt$) of the transmissive display area was 325 nm. The retardation value ($\Delta n \cdot dr$) of the reflective display area was 190 nm. The liquid crystal layer 50 had a parallel alignment, and the twist angle of the liquid crystal layer 50 was 40°. As shown in FIG. 3, the angle $\theta 1$ defined by the reference axis and the absorption axis 26a of the polarizer 26 was 10°; the angle $\theta 2$ defined by the reference axis and the slow axis 2a of the retardation film 2 was 113°; and the angle defined by the reference axis and the slow axis of the retardation film 2' (not shown) was 174°. $\Delta n \cdot d$ of the retardation film 2 was 255 nm, and $\Delta n \cdot d$ of the retardation film 2' was 173 nm.

As shown in FIG. 3, the angle $\theta 7$ defined by the reference axis and the absorption axis 16a of the polarizer 16 was 85°; the angle $\theta 5$ defined by the reference axis and the slow axis 5a of the first retardation film 5 was 80°; and the angle $\theta 6$ defined by the reference axis and the slow axis 6a of the second retardation film 6 was 15°. $\Delta n \cdot d$ of the first retardation film 5 was 110 nm, and $\Delta n \cdot d$ of the second retardation film 6 was 250 nm. With respect to the liquid crystal display device of the comparative example 1 having the above structure, the display characteristics in the reflective display mode and the transmissive display mode were evaluated.

Comparative Example 2

A liquid crystal display device of the comparative example 2 was prepared. The first retardation film 5 of the liquid crystal display device of the comparative example 1 was substituted with a liquid crystal film in which a hybrid alignment is fixed. The in-plane retardation of the substituted liquid crystal film was 110 nm. The angle defined by the tilting direction of the liquid crystal film and the reference axis was −100°. With respect to the liquid crystal display device of the comparative example 2 having the above structure, the display characteristics in the reflective display mode and the transmissive display mode were evaluated.

Figure 4:
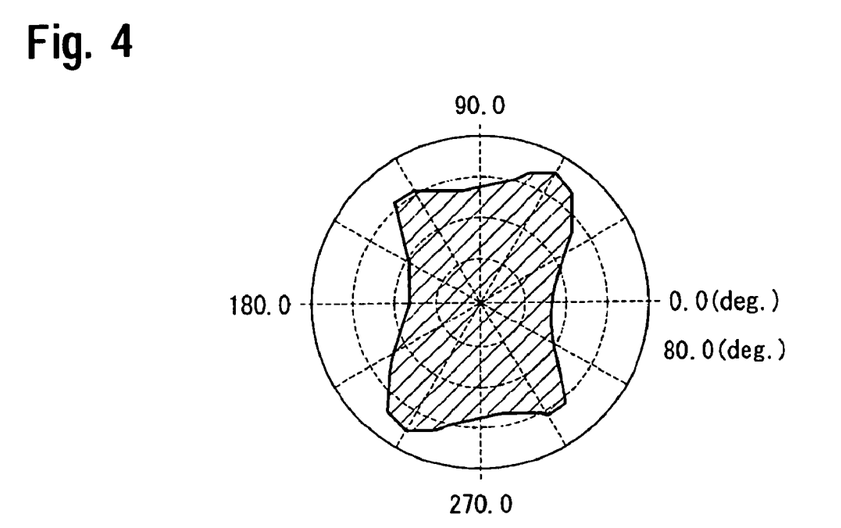
FIG. 4 is a schematic in which the contrast of the reflective display is plotted with respect to the polar angle in relation to the liquid crystal display device of the example.
Figure 5:
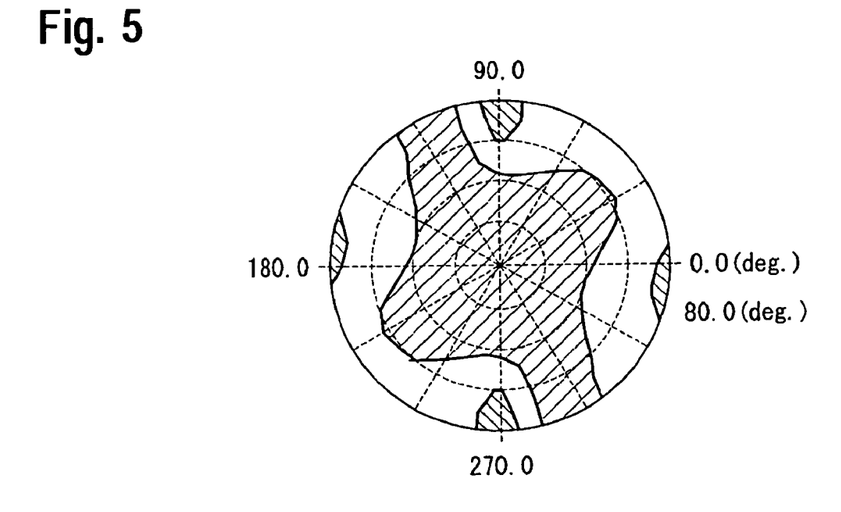
FIG. 5 is a schematic in which the contrast of the reflective display is plotted with respect to the polar angle in relation to the liquid crystal display devices of the comparative examples 1 and 2.
Figure 6:
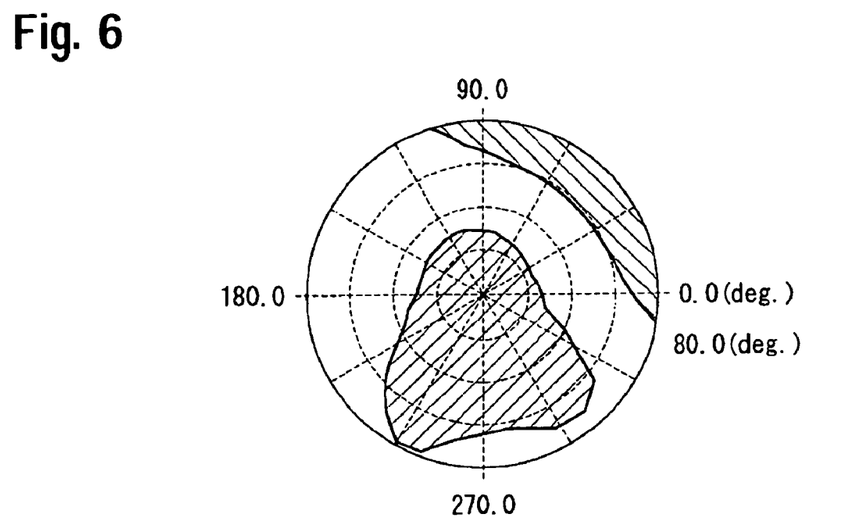
FIG. 6 is a schematic in which the contrast of the transmissive display is plotted with respect to the polar angle in relation to the liquid crystal display device of the example.
Figure 7:
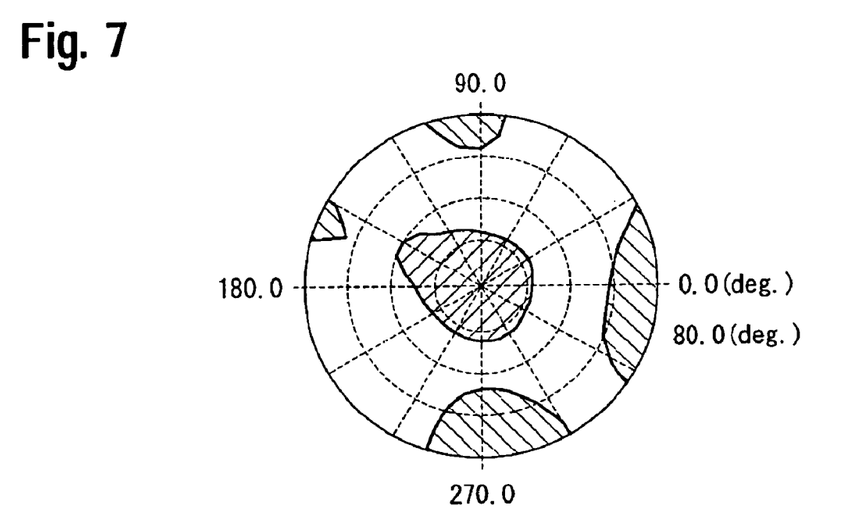
FIG. 7 is a schematic in which the contrast of the transmissive display is plotted with respect to the polar angle in relation to the liquid crystal display device of the comparative example 1.
Figure 8:
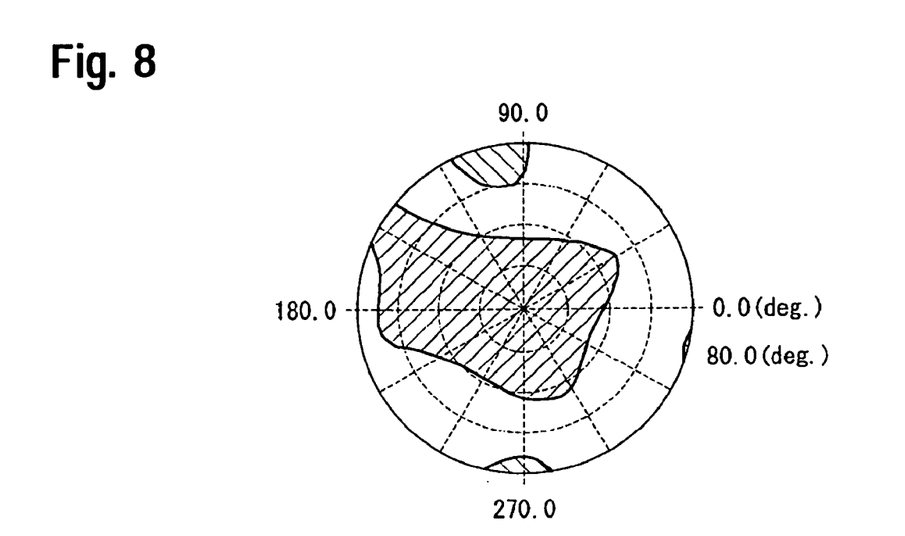
FIG. 8 is a schematic in which the contrast of the transmissive display is plotted with respect to the polar angle in relation to the liquid crystal display device of the comparative example 2.

The evaluation results of the above example and comparative examples 1 and 2 are shown in FIGS. 4 to 8. FIG. 4 is a schematic in which the contrast of the reflective display is plotted with respect to the polar angle in relation to the liquid crystal display device of the example. FIG. 5 is a schematic in which the contrast of the reflective display is plotted with respect to the polar angle in relation to the liquid crystal display devices of the comparative examples 1 and 2. In addition, FIG. 6 is a schematic in which the contrast of the transmissive display is plotted with respect to the polar angle in relation to the liquid crystal display device of the example. FIG. 7 is a schematic in which the contrast of the transmissive display is plotted with respect to the polar angle in relation to the liquid crystal display device of the comparative example 1. FIG. 8 is a schematic in which the contrast of the transmissive display is plotted with respect to the polar angle in relation to the liquid crystal display device of the comparative example 2. In FIGS. 4 to 8, the right hatched areas are the areas in which the contrast is higher than or equal to ten. The left hatched areas are the areas in which the contrast is lower than one.

As shown in FIG. 5, in the liquid crystal display device of the comparative examples 1 and 2, the contrast is low as viewed from an angle in the reflective display mode. However, in the liquid crystal display device of the example, as shown in FIG. 4, it is confirmed that high contrast display is obtained regardless of the viewing angle as compared with the comparative examples 1 and 2.

As shown in FIG. 7, in the liquid crystal display device of the comparative example 1, the contrast is low as viewed from an angle in the transmissive display mode. However, by disposing the liquid crystal film on the back side of the lower substrate as in the comparative example 2, a wide viewing angle is achieved as shown in FIG. 8. Also, it is confirmed that in the example, a wide viewing angle is achieved as shown in FIG. 6.

From the above described results, the following has been confirmed. In order to achieve a wide viewing angle in both the reflective display mode and the transmissive display mode, it is desirable to dispose a liquid crystal film in which a hybrid alignment is fixed on the upper substrate side (that is to say, on the display surface side or the observer's side) as in the example. If the reflective display mode is mainly used, it is possible to contribute to cost reduction and downsizing of the device by disposing the liquid crystal film not both on the upper substrate and on the lower substrate but only on the upper substrate.

Second Exemplary Embodiment

Figure 10:
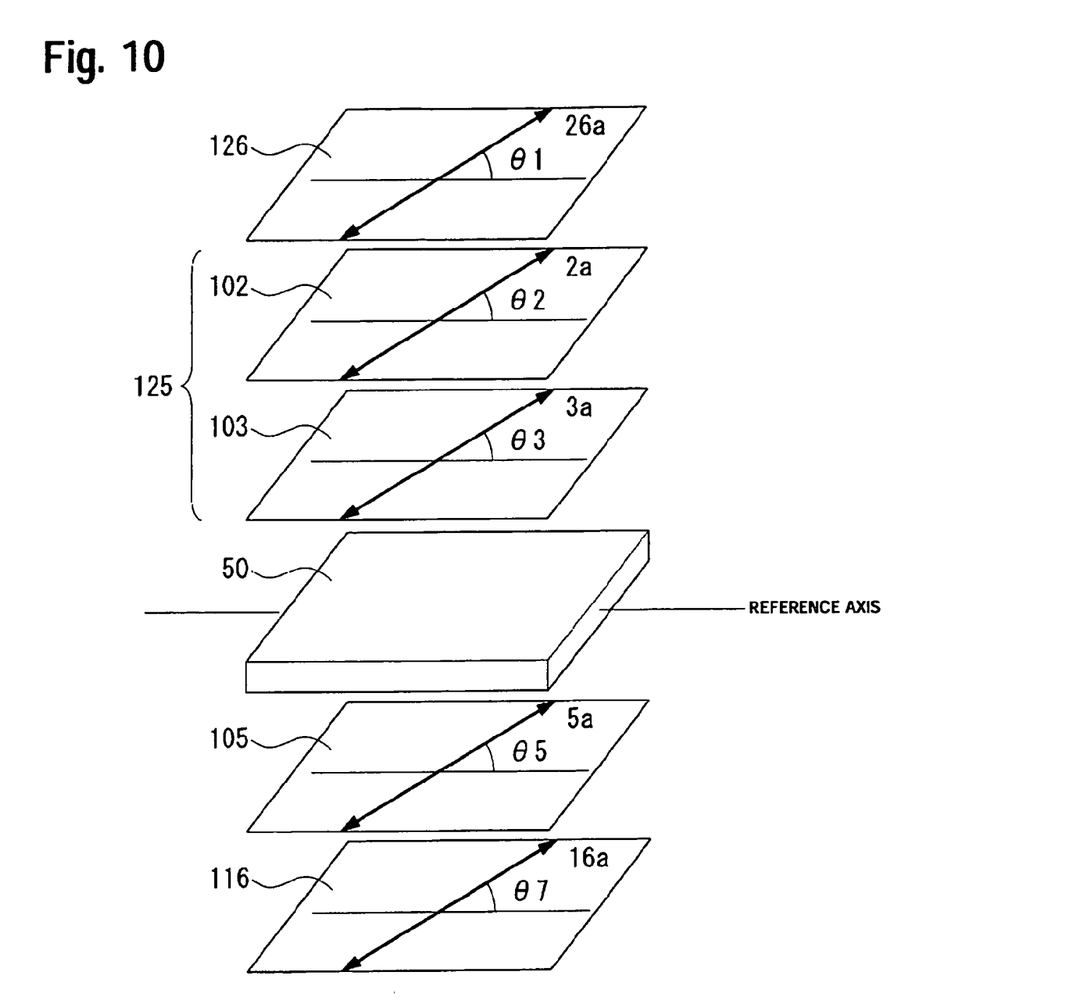
FIG. 10 is a schematic view showing the laminated structure of the liquid crystal display device of the second exemplary embodiment.

A liquid crystal display device of a second exemplary embodiment will now be described with reference to FIG. 10. FIG. 10 is comparable to FIG. 3 of the first exemplary embodiment.

The liquid crystal display device of the second exemplary embodiment is an active-matrix transflective liquid crystal display device as in the first exemplary embodiment. However, as shown in FIG. 10, retardation plates and polarizers provided to the opposed substrates with the liquid crystal layer 50 therebetween are different from those of the first exemplary embodiment. Except for retardation plates and polarizers, since the second exemplary embodiment is the same as the first exemplary embodiment, the description thereof will be omitted.

In this exemplary embodiment, on the backlight side (the outer side of the lower substrate), a retardation plate 115 and a linear polarizer 116 are disposed as an elliptical polarizer. On the observer side (the outer side of the upper substrate), a retardation plate 125 and a linear polarizer 126 are disposed as an elliptical polarizer. The retardation value of the liquid crystal layer 50 is determined at 300 nm in the reflective display area, and at 600 nm in the transmissive display area.

The retardation plate 125 formed on the outer side of the upper substrate has the structure in which a liquid crystal film 103 and a retardation film 102 are laminated in this order from the liquid crystal layer 50 side. In the liquid crystal film 103, a discotic hybrid alignment is fixed. The retardation film 102 is stretched uniaxially. The retardation plate 115 formed on the backlight side is a single retardation film.

The liquid crystal film 103 on the outer side of the upper substrate is arranged so that the axis (slow axis 3a) having the higher refractive index in the plane of the liquid crystal film 103 is substantially perpendicular to the central axis (see FIG. 2) of the liquid crystal layer 50. The retardation of the liquid crystal film 103 is from 0 to 50 nm (for example, about 16 nm). The retardation in this range achieves a wide-band elliptical polarizer.

In order to confirm the advantageous effect of the second exemplary embodiment, with respect to the following example and comparative example, the display characteristics were evaluated.

Example

A liquid crystal display device of the second exemplary embodiment was prepared. The retardation value (Δn·dt) of the transmissive display area was 300 nm. The retardation value (Δn·dr) of the reflective display area was 600 nm. The liquid crystal layer 50 had a hybrid alignment having a parallel alignment with a pre-tilt angle of 3° at the upper substrate, a vertical alignment at the lower substrate, and zero twist angle.

As shown in FIG. 10, the angle θ1 defined by the reference axis and the absorption axis 26a of the polarizer 126 was 45°; the angle θ2 defined by the reference axis and the slow axis 2a of the retardation film 102 was 0°; and the angle θ3 defined by the reference axis and the tilting direction 3a of the liquid crystal film 103 was 90°. Δn·d of the retardation film 102 was 126 nm, and Δn·d of the liquid crystal film 103 was 16 nm.

As shown in FIG. 10, the angle θ7 defined by the reference axis and the absorption axis 16a of the polarizer 116 was 135°; the angle θ5 defined by the reference axis and the slow axis 5a of the retardation film 105 was 90°. Δn·d of the retardation film 105 was 140 nm. With respect to the liquid crystal display device of this example having the above structure, the display characteristics in the reflective display mode and the transmissive display mode were evaluated.

Comparative Example

A liquid crystal display device of the comparative example was prepared. The liquid crystal film 103 was removed from the liquid crystal display device of the second exemplary embodiment. That is to say, the liquid crystal display device of this comparative example had only the retardation film 102 on the outer side of the upper substrate. Δn·d of the retardation film 102 was 110 nm. With respect to this liquid crystal display device, the display characteristics in the reflective display mode and the transmissive display mode were evaluated.

Figure 11:
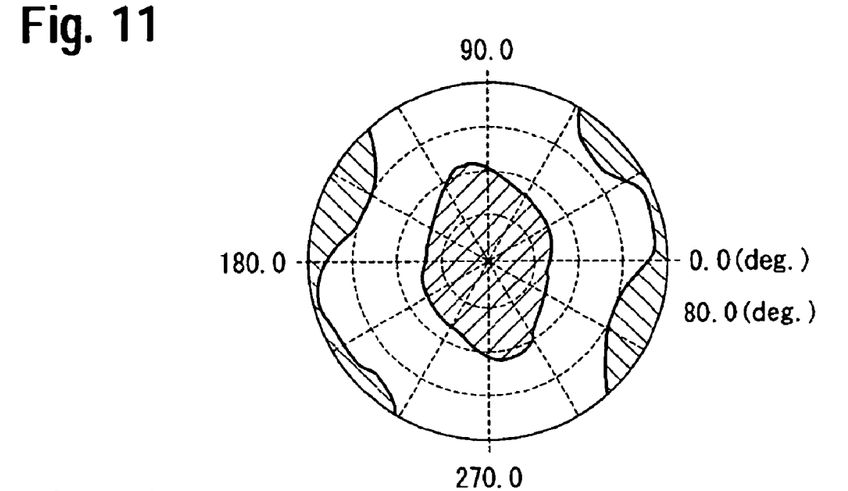
FIG. 11 is a schematic in which the contrast of the reflective display is plotted with respect to the polar angle in relation to the liquid crystal display device of the example.
Figure 12:
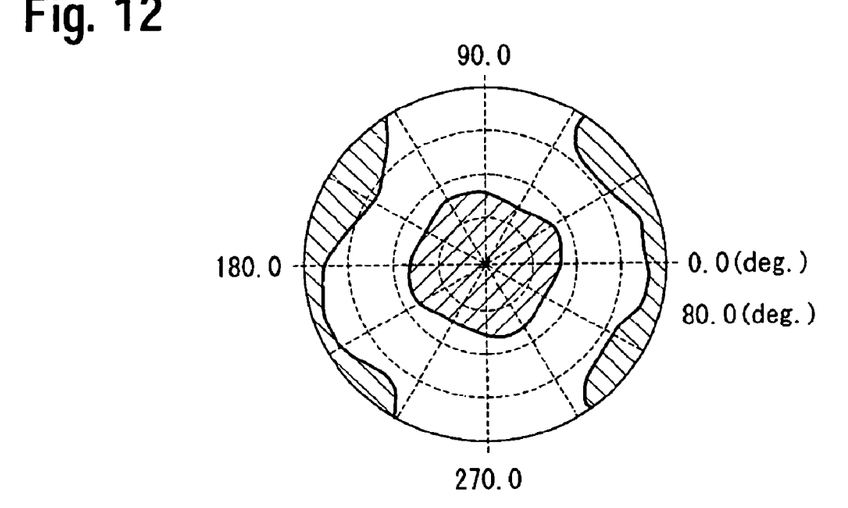
FIG. 12 is a schematic in which the contrast of the reflective display is plotted with respect to the polar angle in relation to the liquid crystal display device of the comparative example.

The evaluation results of the above example and comparative example are shown in FIGS. 11 and 12. FIG. 11 is a schematic in which the contrast of the reflective display is plotted with respect to the polar angle in relation to the liquid crystal display device of the example. FIG. 12 is a schematic in which the contrast of the reflective display is plotted with respect to the polar angle in relation to the liquid crystal display device of the comparative example. In FIGS. 11 and 12, the right hatched areas are the areas in which the contrast is higher than or equal to ten. The left hatched areas are the areas in which the contrast is lower than one. It is confirmed that the high contrast area in the reflective display of the example is wider than that in the reflective display of the comparative example.

Electronic Apparatus

Next, the following description relates to a specific example of an electronic apparatus including the liquid crystal display device of the above exemplary embodiments.

Figure 9:
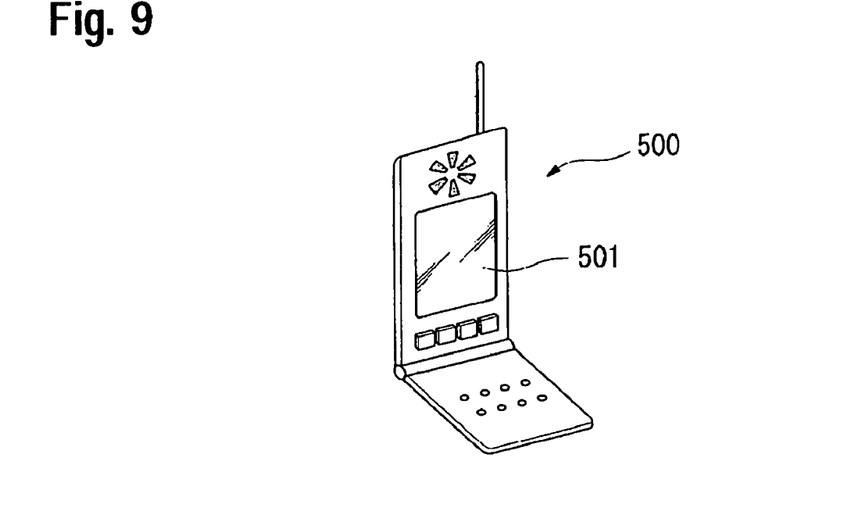
FIG. 9 is a schematic of an electronic apparatus including a liquid crystal display device of an aspect of the present invention as a display unit.

FIG. 9 is a perspective view showing an example of a mobile phone. In FIG. 9, the reference numeral 500 denotes a main body of the mobile phone. The reference numeral 501 denotes a display unit. The above described liquid crystal display device is used as the display unit. Being provided with the liquid crystal display device of the above exemplary embodiments, the electronic apparatus has a liquid crystal display unit that is bright, with high contrast, and with less dependence on the viewing angle regardless of the environment. Since its display is high contrast not only in the transmissive display mode but also in the reflective display mode, it can be provided as an electronic apparatus suitable also for the reflective display uses.

What is claimed is:

1. A liquid crystal display device, comprising:
   a liquid crystal cell, the liquid crystal cell including an upper substrate, a lower substrate, a liquid crystal layer between the upper and lower substrates facing each other, and a transflective layer on an inner surface of the lower substrate;
   a first elliptical polarizer, elliptical polarized light from the upper substrate being incident on the liquid crystal layer; and
   a second elliptical polarizer, elliptical polarized light from the lower substrate being incident on the liquid crystal layer;
   only the first elliptical polarizer having a liquid crystal film in which a hybrid alignment is fixed.

2. The liquid crystal display device according to claim 1, the first elliptical polarizer including a polarizer transmitting linearly polarized light, the liquid crystal film, and a stretched film.

3. The liquid crystal display device according to claim 1, the liquid crystal film being a film in which a nematic hybrid alignment is fixed.

4. The liquid crystal display device according to claim 3, an in-plane retardation of the liquid crystal film ranging from 70 to 140 nm.

5. The liquid crystal display device according to claim 3, an axis having a higher refractive index in a plane of the liquid crystal film being substantially parallel to a central axis of the liquid crystal layer.

6. The liquid crystal display device according to claim 1, the liquid crystal film being a film in which a discotic hybrid alignment is fixed.

7. The liquid crystal display device according to claim 6, the liquid crystal layer having a hybrid alignment having a parallel alignment at one of the substrates, a vertical alignment at the other substrate, and zero twist angle.

8. The liquid crystal display device according to claim 1, a twist angle of the liquid crystal layer ranging from 0° to 70°, a retardation value of the liquid crystal layer in the transmissive display area ranging from 240 to 350 nm, and a retardation value of the liquid crystal layer in the reflective display area ranging from 140 to 260 nm.

9. The liquid crystal display device according to claim 1, the liquid crystal cell having an adjusting layer to make the thickness of the liquid crystal layer in the reflective display area smaller than that in the transmissive display area.

10. An electronic apparatus comprising:
    the liquid crystal display device according to claim 1.

* * * * *